(12) United States Patent
McElroy

(10) Patent No.: US 7,329,997 B1
(45) Date of Patent: Feb. 12, 2008

(54) SYSTEM INCLUDING AN ELECTRONIC BALLAST FOR USE WITH A SPA

(75) Inventor: Patrick McElroy, Costa Mesa, CA (US)

(73) Assignee: Balboa Instruments, Inc., Tustin, CA (US)

( * ) Notice: Subject to any disclaimer, the term of this patent is extended or adjusted under 35 U.S.C. 154(b) by 148 days.

(21) Appl. No.: 11/104,964

(22) Filed: Apr. 12, 2005

Related U.S. Application Data

(63) Continuation of application No. 10/147,110, filed on May 16, 2002, now Pat. No. 6,888,324.

(51) Int. Cl.
*H05B 37/02* (2006.01)
*B01J 19/08* (2006.01)

(52) U.S. Cl. .................................. 315/291; 422/186.3

(58) Field of Classification Search .................. 315/56, 315/200 R, 209 M, 246, 291, 307; 422/24, 422/186, 186.04, 186.07, 186.3
See application file for complete search history.

(56) References Cited

U.S. PATENT DOCUMENTS

| | | | | |
|---|---|---|---|---|
| 4,296,397 A | 10/1981 | Sedberry | ................... | 337/199 |
| 4,595,838 A | 6/1986 | Kerschgens | ............ | 250/504 R |
| 4,752,401 A * | 6/1988 | Bodenstein | ................ | 210/746 |
| 5,010,021 A | 4/1991 | Bell et al. | ................... | 436/120 |
| 5,087,574 A | 2/1992 | Bell et al. | ................... | 436/120 |
| 5,089,098 A | 2/1992 | Tacchi | ........................ | 204/176 |
| 5,106,589 A | 4/1992 | Conrad | .................. | 422/186.15 |
| 5,223,105 A * | 6/1993 | Arthurson | ................... | 204/176 |
| 5,387,400 A | 2/1995 | Pelster | .................. | 422/186.03 |
| 5,478,533 A | 12/1995 | Inculet | .................. | 422/186.07 |
| 5,540,898 A * | 7/1996 | Davidson | ............... | 422/186.15 |
| 5,630,990 A * | 5/1997 | Conrad et al. | ......... | 422/186.07 |
| 5,879,641 A | 3/1999 | Conrad et al. | ......... | 422/186.07 |
| 5,959,408 A | 9/1999 | Steel et al. | ................. | 315/106 |
| 6,129,850 A * | 10/2000 | Martin et al. | ............... | 210/760 |
| 6,331,279 B1 * | 12/2001 | Martin | .................. | 422/186.07 |
| 6,468,400 B2 | 10/2002 | Smith | ......................... | 204/176 |
| 6,514,420 B2 | 2/2003 | Kuennen et al. | ............ | 210/748 |
| 6,712,951 B2 | 3/2004 | Andrews et al. | ............ | 205/626 |

* cited by examiner

*Primary Examiner*—Thuy Vinh Tran
(74) *Attorney, Agent, or Firm*—Steptoe & Johnson LLP

(57) ABSTRACT

A starting circuit for an electric discharge lamp providing an electric current to a lamp having a first and a second filament. The circuit measures a lamp current and a filament temperature and then compares these against a reference voltage. When the lamp current is below a set threshold value, a relay contact disposed between the first and second filament is closed to direct the electric current through the first and second filaments to initiate pre-heating of the lamp. Once the filament temperature exceeds a set threshold, the relay contact is opened and the electric current passes through heated gas inside the lamp.

5 Claims, 5 Drawing Sheets

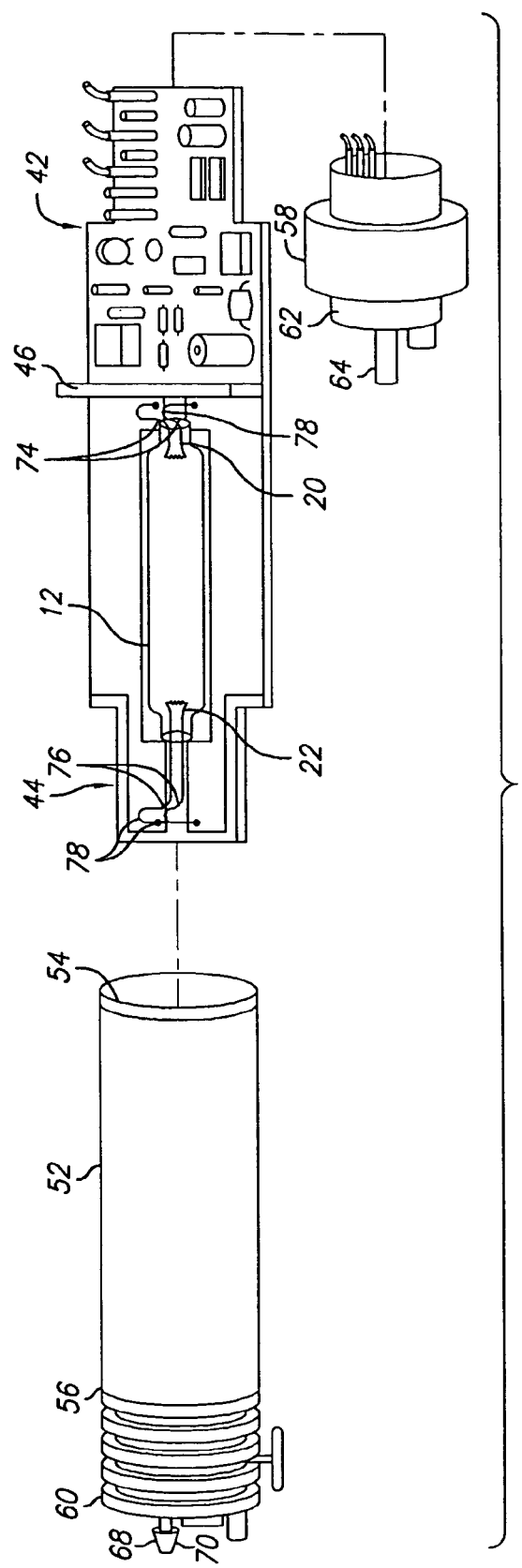
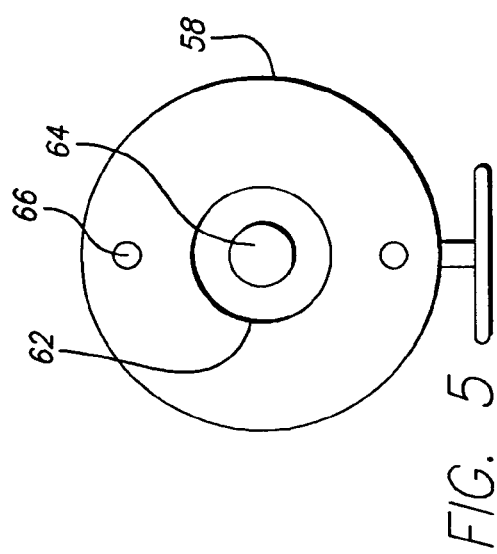
FIG. 4
FIG. 5

SYSTEM INCLUDING AN ELECTRONIC BALLAST FOR USE WITH A SPA

This application is a continuation of U.S. Ser. No. 10/147,110, filed May 16, 2002, which is now U.S. Pat. No. 6,888,324.

BACKGROUND OF THE INVENTION

This invention relates to a starting circuit for an electrical discharge lamp, and more specifically to a starting circuit that pre-heats the electrical discharge lamp above a predetermined temperature before illumination.

An electrical discharge lamp such as a fluorescent lamp, neon sign, mercury-vapor light, and sodium vapor light, includes a pair of electrodes and an amount of mercury and inert gas(es) sealed inside a glass tube at a low pressure. The inside of the glass tube may be coated with a phosphor that produces visible light when excited by ultra-violet radiation. The pair of electrodes may be filaments that can be heated during a starting process to preheat the gases inside the glass tube in order to decrease the voltage requirements. When the lamp is off, the gases inside the glass tube are non-conductive, so when power is first applied, a high voltage is needed to initiate the discharge. These high voltages exhaust the filaments and therefore decrease the life of the lamp. However, once the initial discharge occurs, much lower voltage, usually under 100 V for tubes under 30 watts, and 100 to 175 V for 30 watts or higher, is needed to maintain the discharge. The electric current flowing through the gas filled glass tube emits ultra-violet radiation, and the internal phosphor coating converts the ultra-violet radiation into visible light. One can modify the mix of phosphor used inside the glass tube to control the light spectrum that is emitted for a specific application.

In one application, a mercury vapor electric discharge lamp may be used in the production of ozone, $O_3$, in a means to purify water. Ozone is produced when oxygen, $O_2$, is exposed to an electrostatic discharge, or when oxygen contains gas absorbed ultra-violet radiation. Common ozone generators for water purification involve using an electric discharge lamp that emits ultra-violet light that converts oxygen to ozone. Ozone generators may be configured for use in a spa or hot tub in order to purify or cleanse the water. In such capacity, the ozone produced would be injected into the water where bacteria, viruses, and organic and inorganic compounds would be destroyed.

Electric discharge lamps including mercury vapor electric discharge lamps are started in a variety of ways. One such way is using a glow tube starter that includes a switch which is normally open. Once power is applied to the glow tube starter, a glow discharge takes place which heats a bimetal contact. A small amount of time later (about 1 second) the contacts close which provides a current to the filaments, and since the glow is extinguished, the bimetal is no longer heated and the contacts open. An inductive kick generated at the instant the contacts open, triggers the main discharge in the lamp. However, if the contacts open at a time when the current is near zero, then there will not be a large enough inductive kick to start to the lamp. Therefore, these starters may be unreliable.

Another example of a starter is a pulse starter that is pin compatible and contains electronic circuits that detect the proper time to interrupt the filament circuit to generate the optimal inductive kick to trigger the main discharge. Similar to the glow tube starter, an inductive kick is needed to trigger the main discharge which lowers the life of the lamp by exhausting the filaments. Therefore, what is needed is a starter that provides reliable starting and prolongs the life of the lamp.

The devices and methods of the present invention address these and other needs.

SUMMARY OF THE INVENTION

Briefly and in general terms, the present invention embodies a starting circuit for an electrical discharge lamp. In one embodiment, the starting circuit is used in conjunction with an ozone generating system. In an ozone generating system, the starting circuit may be connected to a mercury vapor electric discharge lamp, in which the starting circuit improves the reliability of the lamp starting and also improves the life of the lamp. In one embodiment, the lamp may be soldered to the circuit board in such a way to provide shock absorption and to protect the lamp bulb.

The starting circuit of the present invention pre-heats the filaments of the lamp to a certain temperature before illumination of the lamp. The starting circuit measures a temperature of at least one of the lamp filaments, and allows the lamp to start only when the temperature is at a desired level. By pre-heating the filaments and the associated gas inside the lamp, a firing voltage across the inside of the lamp decreases, allowing an electrical current to flow across the heated gas from one filament to another, thereby illuminating the lamp. In this embodiment, the lamp starts without an inductive kick.

In one aspect of the invention, the starting circuit for an ozone generating system includes a lamp with a first and a second electrode. Also included is a control relay disposed between the first and the second electrode. The filament control relay has a closed position to direct electric current through the first and second electrodes, and an open position to allow electric current to pass through the lamp from the first electrode to the second electrode. There is also a temperature detector disposed between the first and second electrode, the temperature detector sets the control relay in the open position when an electrode temperature is greater than a threshold value. Once the temperature detector sets the control relay in the open position, the electric current will pass through the lamp without needing an inductive kick to start the lamp. This starting circuit may also include a peak voltage detector in connection with the second electrode and detecting voltage across the first and second electrodes. The peak voltage detector sets the control relay in the closed position when the voltage across the first and second electrodes is less than a threshold value. When in the closed position, pre-heating of the filaments and associated gas inside the lamp begins.

In another aspect, the starting circuit includes an inrush limiting and transient protection component to limit a starting current and to protect the starting circuit from voltage spikes. There is also an A.C. rectification and voltage doubler component coupled to the inrush limiting and transient protection component that produces D.C. volts. An A.C. driver is coupled to the A.C. rectification and voltage doubler component, and produces a square wave output and also blocks D.C. current from passing through the electric discharge lamp.

The electric discharge lamp ("lamp") has a first electrode and a second electrode, with the first electrode being connected to the A.C. driver. The first and second electrodes may in fact be first and second filaments. Electric leads may be in connection with the filaments at one end, and the electric leads may be soldered to the circuit board at the opposite end. A filament control relay having a closed and open position is disposed in connection with and in between the first filament and the second filament. In the closed position the filament control relay directs the current through the first and second filaments to initiate pre-heating of the filaments and associated gas inside the lamp. The open position of the filament control relay allows the current to flow along the heated gas inside the lamp from the first filament to the second filament which illuminates the lamp.

The starting circuit may also include a sense resistor that is connected to the second filament of the electric discharge lamp. All current flowing through the lamp passes through the sense resistor, whether the lamp is in the pre-heating stage or the operational stage. Any voltage developed across the sense resistor when the filament control relay is in the open position indicates the operating condition of the lamp, since the only path the current would have from the first filament to the second filament would be across the gas inside the lamp. There is a peak voltage detector connected to the sense resistor which detects the voltage across the sense resistor. A filament temperature peak voltage detector is connected between the first filament and the second filament, and is located below the filament control relay. The filament temperature peak voltage detector detects voltage across the first and second filaments when the filament control relay is in the closed position, and uses the detected voltage to determine the temperature of the filaments.

The starting circuit can include a control logic component that receives signals from the peak voltage detector and the filament temperature peak voltage detector, analyzes these signals and determines whether the filament control relay should be in the closed or open position. When the current from the peak voltage detector is less than a first threshold value, the control logic component sets the filament control relay in the closed position to initiate the pre-heating phase. The control logic component will then reset the filament control relay to the open position when the current from the filament temperature peak voltage detector is greater than a second threshold value. If once the filament control relay is in the open position and the lamp fails to operate, the voltage across the sense resistor will drop below the threshold value and the control logic component will close the filament control relay to start the process over again.

One advantage of the present invention is that it provides reliable starting by heating the filaments of the lamp to a predetermined temperature in order to decrease the starting voltage across the lamp.

Another advantage of the present invention is that it improves the life of the electric discharge lamp because the voltage needed to start illumination of the lamp is less than the voltage needed using a previous starter that requires an inductive kick to start illumination of the lamp.

A further advantage of the present invention is that the starting circuit is capable of accepting voltages from 100-270 volts, and frequencies from 45-65 hertz.

Yet another advantage of the present invention is that the lamp may be soldered onto the circuit board in such a way that provides shock absorption and protects the lamp.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 4 is a partially exploded perspective view of an ozone generator including the circuit board shown in FIG. 3 with a lamp soldered thereon; and FIG. 5 is an end view of a first end cap of the ozone generator shown in FIG. 4.

DETAILED DESCRIPTION OF THE PREFERRED EMBODIMENTS

Figure 1:
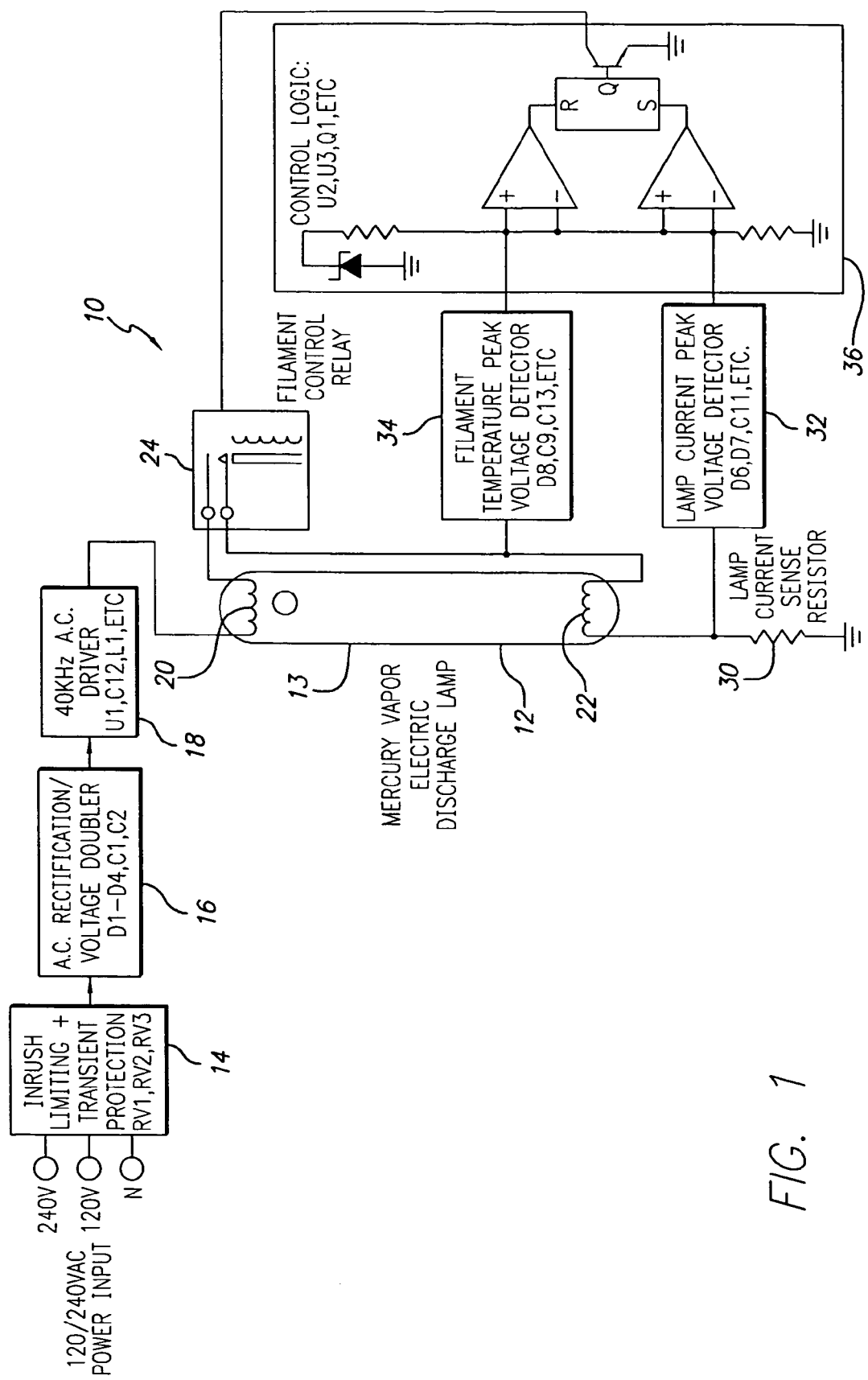
FIG. 1 is a block diagram of one embodiment of a starting circuit connected to an electrical discharge lamp.

Referring now to the drawings, a starting circuit for an ozone generator system based on a mercury vapor electric discharge lamp is shown, however, the present invention may be used for starting any electric discharge lamp. As shown in FIG. 1, a starting circuit, generally designated 10, for an electric discharge lamp 12 pre-heats the filaments and associated gas inside the lamp to a certain temperature before illuminating the lamp. The starting circuit 10 will accept voltages from 100-270 volts and frequencies from 45-65 hertz. The starting circuit 10 has an electric current provider including an inrush limiting and transient protection component 14 to limit the voltage of a starting current and to protect the starting circuit from voltage spikes. There is also an A.C. rectification and voltage doubler component 16 coupled to the inrush limiting and transient protection component 14 that produces D.C. volts. An A.C. driver 18 is coupled to the A.C. rectification and voltage doubler component 16 and produces a square wave output and blocks D.C. current from passing through the electric discharge lamp 12.

Figures 1, 2:
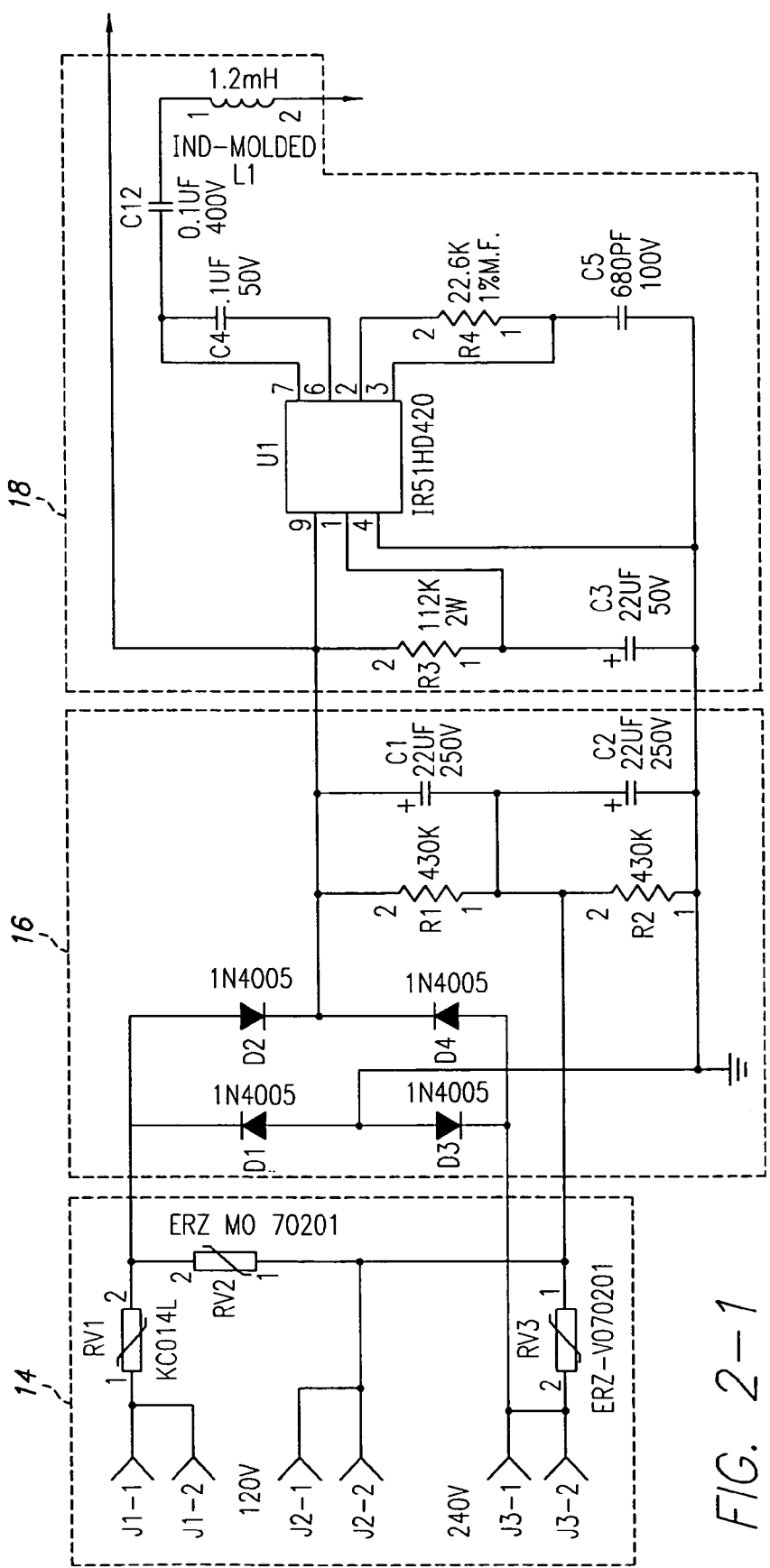
FIG. 2 is a detailed electrical schematic diagram of the embodiment shown in FIG. 1.
Figure 2:
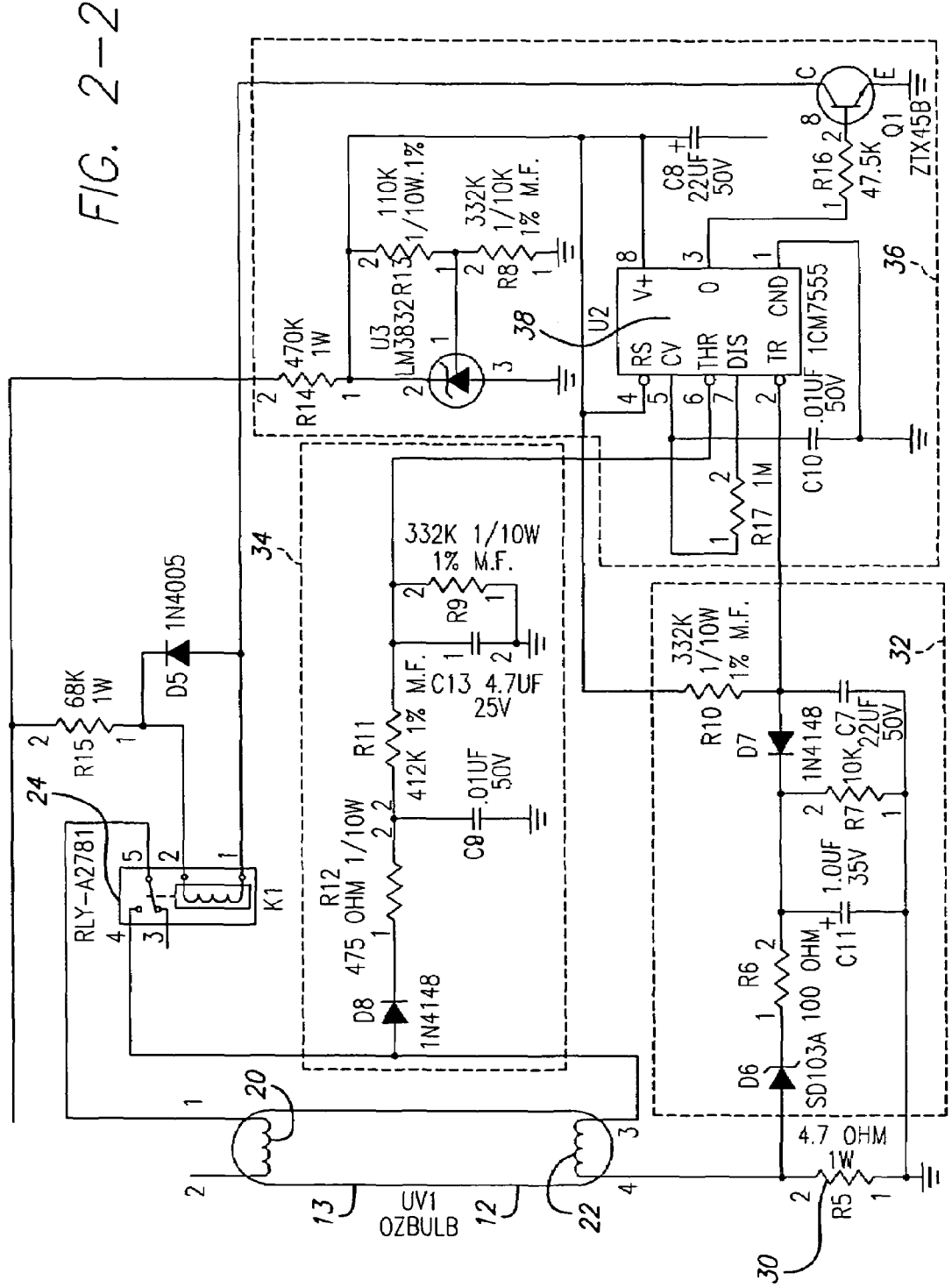

In more detail, as shown in FIG. 2, the inrush limiting and transient protection component 14 includes varistor RV1 which limits the starting current to less than 3 A for a 100 to 130 VAC input and less than 6 A for a 200 to 270 VAC input. The inrush limiting and transient protection component 14 further includes varistors RV2 and RV3 which protect the starting circuit 10 from A.C. voltage spikes. The A.C. rectification and voltage doubler component 16 includes diodes D1-D4, and capacitors C1 and C2, and will double and rectify a 100 to 130 VAC input and will full wave rectify a 200 to 270 VAC input. For either input, the A.C. rectification and voltage doubler component 16 will produce up to 400 VDC. The A.C. driver 18 is actually an A.C. driver in this embodiment, and includes, among other things, a self-contained oscillater/half bridge driver U1 which produces up to a 400V peak to peak square wave output. The A.C. driver 18 also includes capacitor C12 which blocks D.C. current from passing through the first and second filaments 20 and 22 of the lamp 12. Another component of the A.C. driver 18 is L1 which acts as a current limiter, more commonly referred to as a ballast.

Still referring to FIG. 1, the electric discharge lamp ("lamp") 12 has a first filament 20 and a second filament 22 sealed inside a glass tube 13. In this embodiment, the glass tube also contains mercury and inert gases at a low pressure. The first filament 20 is connected to the A.C. driver 18, and more accurately as shown in FIG. 2, the first filament is connected to the ballast L1. In this embodiment, the lamp can be a standard mercury vapor electric discharge lamp having titanium free glass that allows transmission of a 185-nM wavelength ultra-violet light for ozone generation. In this type of lamp, the filament resistance changes by a factor of approximately 4:1 with a temperature change from ambient to glow temperature. This change in resistance results in a voltage change across the filament that indicates when the lamp is preheated sufficiently.

Referring to FIGS. 1 and 2, a filament control relay 24 is positioned between the first filament 20 and the second filament 22, and has a closed and open position. In the closed position the filament control relay directs the current through the first and second filaments 20 and 22 to initiate pre-heating of the filaments and gas inside the lamp 12. The firing voltage across the inside of the lamp decreases as the filaments and gas inside the lamp heat up. The open position (shown best in FIG. 2) of the filament control relay 24 allows the current to pass through the heated gas or plasma inside the lamp 12 from the first filament 20 to the second filament 22 to start the lamp.

The starting circuit 10 also includes a sense resistor 30 (shown also as R5 in FIG. 2) that is connected to the second filament 22 of the electric discharge lamp. All current flowing through the lamp 12 passes through the sense resistor 30. Voltage developed across the sense resistor when the filament control relay 24 is in the open position indicates the operating condition of the lamp 12, because when the control relay is open, the current can only reach the second filament 22 by traveling through the lamp.

There is a peak voltage detector 32 connected to the sense resistor 30 that detects voltage across the sense resistor. As shown in FIG. 2, the peak voltage detector 32 includes diodes D6 and D7, capacitors C7 and C11, and resistors R6, R7 and R10. Diode D6 and capacitor C11 rectify and peak detect the voltage across sense resistor 30 (R5). Resistor R10 and diode D7 add approximately 0.7V to the detected voltage signal in order to create a time delay effect.

A filament temperature peak voltage detector 34 is connected between the first filament 20 and the second filament 22, and below the filament control relay 24. The filament temperature peak voltage detector 34 detects voltage across the first and second filaments 20 and 22 when the filament control relay 24 is in the closed position, during the pre-heating stage. Referring to FIG. 2, the filament temperature peak voltage detector 34 includes diode D8, resistors R9, R11 and R12, and capacitors C9 and C13. Diode D8 and capacitor C9 rectify and peak detect the voltage across the first and second filaments 20 and 22. Resistors R9 and R11 along with capacitor C13 scale this detected voltage and add a time delay. In one embodiment, the time delay is approximately 100 mS. The filament temperature peak voltage detector 34 determines the temperature of at least one of the filaments 20 and 22 by measuring the voltage that results from the current passing through, multiplied by its own electrical resistance. This formula is in direct relation with the filament temperature because the electrical resistance is temperature dependent.

Referring to both FIGS. 1 and 2, a control logic component 36 receives signals from the peak voltage detector 32 and the filament temperature peak voltage detector 34, analyzes these signals and determines whether the filament control relay 24 should be in the closed or open position. When the current from the peak voltage detector 32 is less than a first threshold value, the control logic component 36 sets the filament control relay 24 in the closed position to initiate the pre-heating phase. The control logic component 36 will then reset the filament control relay 24 to the open position when the signal from the filament temperature peak voltage detector 34 is greater than a second threshold value.

In greater detail, the control logic component 36 includes components U2, U3, and Q1. Component U3 and associated components shown in FIG. 2 provide an accurate and stable voltage supply and reference for the control logic component 36. Component U2 is a low power version of a ubiquitous 555 timer/oscillator I.C. which includes a R-S flip-flop 38, a lower comparator having a lower preset threshold, and an upper comparator having an upper preset threshold. It is the output of U2 that controls the filament control relay 24 through component Q1. Component U2 of the control logic component 36 sets the R-S flip-flop 38 when the signal from the peak voltage detector 32 is less than the lower preset threshold, which causes the filament control relay 24 to close. Once the filament control relay 24 is in the closed position, pre-heating of the first and second filaments 20 and 22 begins, which also heats the gas inside the lamp 12. Component U2 then resets the R-S flip-flop 38 when the signal from the filament temperature peak voltage detector 34 is greater than the upper preset threshold, which causes the filament control relay 24 to open. When the filament control relay 24 is in the open position, the electric current flows from the first filament 20 through the heated gas inside the lamp 12 to the second filament 22, causing illumination of the lamp.

Due to lamp performance variations or ambient operating temperatures, not all lamps will start after the filament control relay 24 opens. However, if the lamp 12 does not start when the filament control relay 24 is opened, the voltage across the sense resistor 30 will fall below the lower preset threshold because no current will be flowing through the second filament 24. The control logic component 36 will detect this change and set the R-S flip-flop 38 which will in-turn close the filament control relay 24. The time delay features in the peak voltage detector 32 and the filament temperature peak voltage detector 34 insure that with each subsequent heating cycle, the filaments 20 and 22 will progressively be heated to a higher temperature until the lamp starts.

Figure 3:
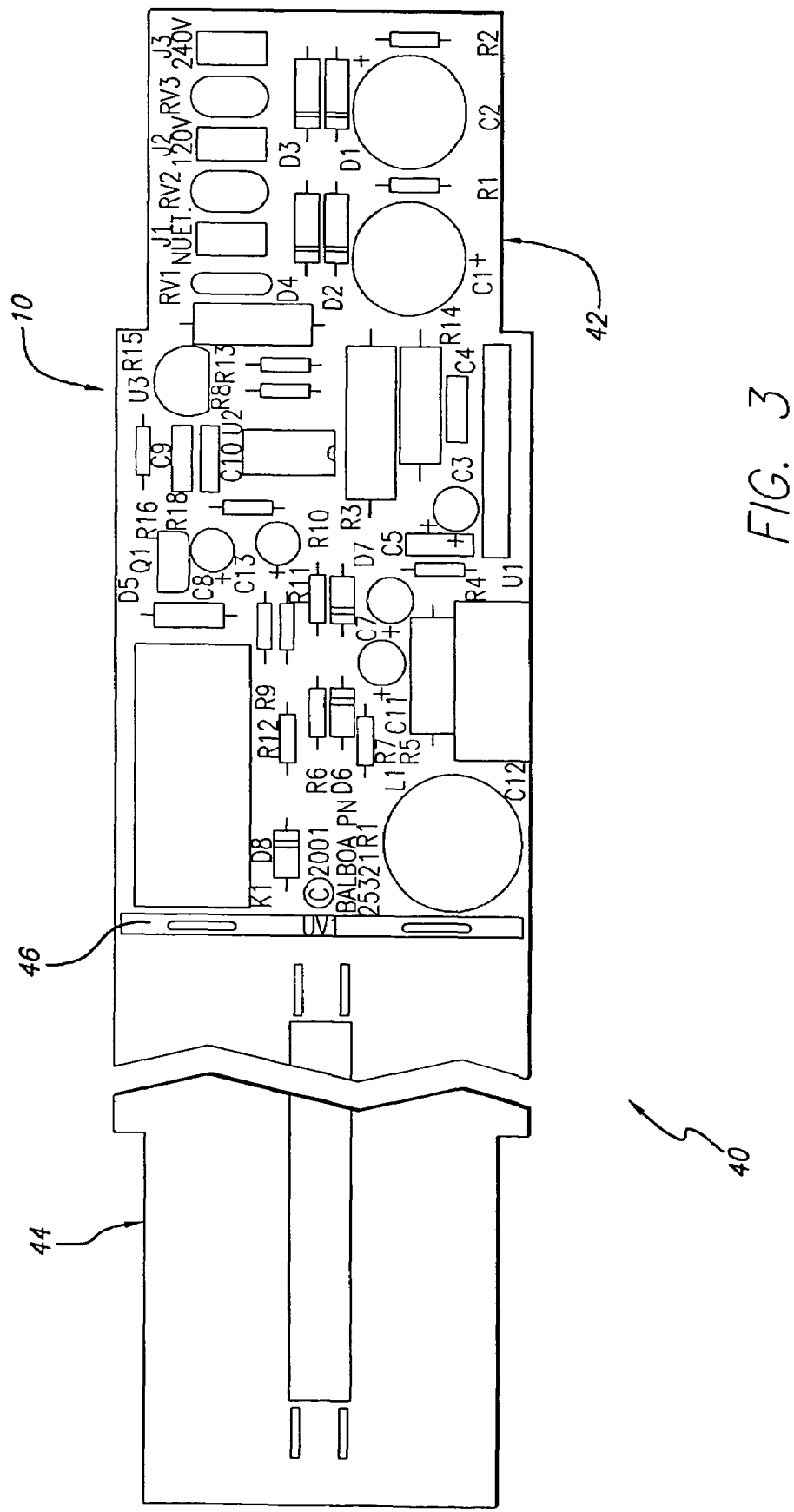
FIG. 3 is a planar view of a circuit board having various components corresponding to the embodiment shown in FIGS. 1 and 2.

An assembled circuit board 40 is shown in FIG. 3. The components of the circuit board 40 shown in FIG. 3 correspond to the components of the starting circuit 10 depicted in FIGS. 1 and 2. The circuit board 40 has a circuit end 42 and a lamp end 44, and a divider 46 that separates the lamp end from the circuit end.

An ozone generator, generally referred to as 50, is shown in FIG. 4 and includes the starting circuit 10 previously described. The ozone generator includes a housing 52 having a first end 54 and a second end 56, and in one embodiment is formed into a cylindrical shape. The housing may be manufactured from several materials including metals, plastics, polymers, or ceramics. In this embodiment, the housing is formed from a polyvinyl chloride (PVC) pipe. There is also a first end cap 58 and a second end cap 60, and both are shaped to attach to the first and second ends 54 and 56 of the housing 52. The first end cap 58 includes a port 62 which provides an access for an electrical cord or wire 64 that connects to and provides electricity to the starting circuit 10. As shown in FIG. 5, an inlet hole 66 is also disposed on the first end cap 58. A gas including oxygen ($O_2$) would be forced through the inlet hole 66 into the interior of the housing 52, where the gas would flow around the divider 46 and into the area where the lamp 12 is disposed. The oxygen in the gas will absorb the ultraviolet radiation emitted by the lamp and be converted into ozone ($O_3$).

Referring again to FIG. 4, the second end cap 60 includes an outlet spout 68 that provides fluid communication with the interior of the housing 52, and in the embodiment shown in the drawing, the outlet spout includes a tapered end 70. The outlet spout 68 directs any gas including ozone out of the housing 52. The circuit board 40 is fitted inside the housing 52 with the circuit end 42 towards the first end cap 58. A reflective material (not shown), which in this embodiment is aluminum, is separately inserted into the housing 52 or is attached inside the housing to at least cover the inside area of the housing surrounding the lamp 12.

In one embodiment, the lamp 12 is attached to the circuit board 40 by soldering. As best shown in FIG. 4, a first and a second pair of electric leads 74 and 76 are joined to the first and second filaments respectively at one end, and are soldered to the circuit board at the opposite end. The electric leads 74 and 76 each have a loop portion 78 which are designed to absorb shock and protect the lamp 12. Also, by using a solder to attach the lamp to the circuit board 40, the cost of manufacturing is decreased.

The ozone generator 50 may be configured to work in a spa or hot tub, in which case the ozone created inside the housing 52 would flow out through the outlet spout 68 and be injected into the water for cleansing purposes. The ozone generator 50 may be adopted to work with any application where purification or cleansing of water is desired.

In summary, the starting circuit 10 of this embodiment will pre-heat the filaments along with the associated gas inside the lamp 12 until the filaments reach a predetermined temperature to provide reliable starting and improve life of the lamp. First, an electrical current must be applied to the starting circuit 10. Once powered, the starting circuit 10 begins measuring the lamp current across the two filaments 20 and 22, and comparing the lamp current to a first set threshold. Since the control relay 24 normally begins in the open position, there will be no current flowing across the second filament 22, and therefore the lamp current will be less than the first set threshold. The starting circuit 10 will close the control relay 24 when the lamp current is less than the first set threshold, allowing the electrical current to pass through the two filaments 20 and 22 to initiate pre-heating. In this embodiment, the starting circuit 10 requires about 5 seconds to effectively pre-heat the lamp. As the lamp 12 pre-heats, the starting circuit 10 is continuously measuring the filament temperature of at least one of the two filaments 20 and 22, and comparing the filament temperature to a second set threshold. Once the filament temperature becomes greater than the second set threshold, meaning that the firing voltage across the lamp has been reduced, the control relay is reset to the open position, allowing the electrical current to pass through the lamp. The resistance inside the lamp 12 is low enough that an inductive kick is not needed to start the lamp, and therefore the life of the lamp will be improved. At this stage, the lamp should be operational, however, in case the lamp does not start, the voltage across the second filament 22 will fall below the first set threshold and the starting circuit will close the control relay to start pre-heating over again. If needed, the process will repeat until the lamp becomes operational.

Thus, it will be apparent from the foregoing that, while particular forms of the invention have been illustrated and described, various modifications can be made without parting from the spirit and scope of the invention. For example, the starting circuit may be used with any electric discharge lamp. Also, the starting circuit may be used in many application including an ozone generator. Accordingly, it is not intended that the invention be limited, except as by the appended claims.

What is claimed is:

1. A system for use with a spa, comprising:
   an electronic ballast that excites a gas-filled lamp operatively associated with the spa;
   wherein the system is configured to accept voltages in a range from 100 to 270 volts and frequencies greater than 45 hertz;
   wherein the electronic ballast forms part of an AC driver;
   wherein the AC driver is coupled to an AC rectifier and voltage doubler.

2. The system of claim 1, wherein the electronic ballast is configured to facilitate ozone generation.

3. The system of claim 1, wherein the electronic ballast acts as a current limiter.

4. The system of claim 1, wherein the AC rectifier and voltage doubler is coupled to an inrush limiting and transient protection component.

5. The system of claim 4, wherein the inrush limiting and transient protection component forms part of a starter circuit for an ozone generator.

* * * * *